(12) United States Patent
Daher et al.

(10) Patent No.: US 8,452,648 B2
(45) Date of Patent: May 28, 2013

(54) METHOD OF FACILITATING THE MARKETING, REDEMPTION, AND REIMBURSEMENT OF PREPAID VEHICLE SERVICES IN A VEHICLE SERVICE NETWORK

(75) Inventors: Romelo Daher, Southgate, MI (US); Tim Barnette, Allen Park, MI (US)

(73) Assignee: Romelo Daher, Dearborn Heights, MI (US)

( * ) Notice: Subject to any disclaimer, the term of this patent is extended or adjusted under 35 U.S.C. 154(b) by 2354 days.

(21) Appl. No.: 11/207,146

(22) Filed: Aug. 18, 2005

(65) Prior Publication Data

US 2007/0043614 A1    Feb. 22, 2007

(51) Int. Cl.
*G06Q 30/00* (2012.01)
*G06Q 40/00* (2012.01)
*G07D 11/00* (2006.01)
*G07F 19/00* (2006.01)
*G06F 7/08* (2006.01)
*B05B 9/00* (2006.01)
*G06Q 30/02* (2006.01)

(52) U.S. Cl.
CPC ............ *G06Q 30/0207* (2013.01); *G06Q 40/00* (2013.01); *G07D 11/00* (2013.01); *G07F 19/00* (2013.01); *G06F 7/08* (2013.01); *B05B 9/00* (2013.01)
USPC ........... 705/14.1; 235/379; 235/381; 239/144

(58) Field of Classification Search
USPC . 364/551; 235/379, 381; 239/144; 705/14.11
See application file for complete search history.

(56) References Cited

U.S. PATENT DOCUMENTS

| | | | |
|---|---|---|---|
| 4,404,639 A * | 9/1983 | McGuire et al. | ................ 701/35 |
| 6,119,099 A | 9/2000 | Walker et al. | |
| 6,243,687 B1 | 6/2001 | Powell | |
| 6,568,599 B2 | 5/2003 | Lahey et al. | |
| 7,131,578 B2 * | 11/2006 | Paschini et al. | ................ 235/379 |
| 2002/0188483 A1 * | 12/2002 | Fisher | ................ 705/4 |
| 2002/0194063 A1 | 12/2002 | Learner et al. | |
| 2002/0195503 A1 * | 12/2002 | Allen et al. | ................ 239/144 |
| 2003/0033154 A1 | 2/2003 | Hajdukiewicz et al. | |
| 2003/0036950 A1 | 2/2003 | Nguyen | |
| 2003/0083935 A1 | 5/2003 | Dickson | |
| 2003/0093319 A1 | 5/2003 | Jarman | |
| 2003/0130891 A1 | 7/2003 | Jacobs | |
| 2003/0149623 A1 | 8/2003 | Chen | |
| 2003/0197060 A1 * | 10/2003 | Coyner | ................ 235/381 |
| 2003/0236704 A1 | 12/2003 | Antonucci | |
| 2004/0111324 A1 * | 6/2004 | Kim | ................ 705/22 |
| 2004/0122732 A1 | 6/2004 | Comer | |
| 2004/0158493 A1 | 8/2004 | Nicholson | |
| 2004/0225582 A1 | 11/2004 | Spitzer | |
| 2005/0171829 A1 * | 8/2005 | Doyle et al. | ................ 705/8 |

* cited by examiner

*Primary Examiner* — Afaf Osman Bilal Ahmed
(74) *Attorney, Agent, or Firm* — Reising Ethington P.C.

(57) ABSTRACT

A computer-assisted method of facilitating the marketing, redemption, and reimbursement of prepaid vehicle services in a vehicle service network. A network administrator screens vehicle service stations, and accepted participant service stations pay fees, which may be used to advertise the network to consumers. The network administrator enrolls consumers in the network as members, and receives prepaid vehicle service fees from the members to credit member accounts in exchange for vehicle services to be rendered by the participant service stations. The administrator issues voucher data to the members and associates the voucher data with member accounts. Members redeem the voucher data at participant service stations, wherein the voucher data is used to verify membership, authorize vehicle services at the participant service stations, and debit the member accounts. The participant service stations send receipt data to the administrator, which reimburses the participant service stations for the rendered vehicle services.

21 Claims, 5 Drawing Sheets

METHOD OF FACILITATING THE MARKETING, REDEMPTION, AND REIMBURSEMENT OF PREPAID VEHICLE SERVICES IN A VEHICLE SERVICE NETWORK

TECHNICAL FIELD

The present invention relates generally to a method of facilitating vehicle service and, more particularly to a method of facilitating the marketing, redemption, and reimbursement of prepaid vehicle services in a vehicle service network.

BACKGROUND

At one time or another, every automobile operator will have a need for automotive repair or service. For example, an operator of a new vehicle will have to take the vehicle to a dealership or service station to perform an oil change to comply with a manufacturer's vehicle warranty. In another example, an operator of a used vehicle will also need to obtain vehicle oil changes and will additionally require routine replacement of worn components like tires, brakes, fluids, and more.

Current cost estimates of necessary annual vehicle services average approximately $250 for new vehicles and about $750 to $1,000 for used vehicles. Unfortunately, however, vehicle operators are often persuaded to pay much more, in the form of inflated prices or unnecessary services. Accordingly, automobile repair fraud is widely known to consistently rank at the top of consumer complaints to government authorities.

Although a few prior art business methods for providing automobile service have been proposed, there is no comprehensive method of facilitating secure, cost-effective, and reliable vehicle servicing. For example, no present approaches provide a thorough process that involves initial screening of service stations, and allowing consumers to choose a service station among a pre-screened network of participant service stations. As another example, no current approaches provide marketing of prepaid vehicle services to consumers, secure redemption of the prepaid vehicle services, and reimbursement to the service stations for the prepaid vehicle services. As a further example, no current approaches provide a centralized system accessible anywhere including a program to access various vehicle service management features or a centralized database containing all data relevant to member customers and participant service stations. As yet another example, many vehicle service approaches deploy expensive mailed coupon campaigns, or complicated incentive, loyalty, or rewards programs, or the like, but no existing approaches include a means for pooling marketing resources of screened service stations to target consumers as potential customers or network members. Accordingly, there is much room for improvement in method of facilitating automobile servicing.

BRIEF SUMMARY

According to an exemplary embodiment of a computer-assisted method of facilitating the marketing, redemption, and reimbursement of prepaid vehicle services in a vehicle service network, a network administrator may screen vehicle service stations and accepted participant service stations may pay fees, which may be used to advertise the network to consumers. Moreover, the network administrator may enroll consumers in the network as members, and may receive prepaid vehicle service fees from the members to credit member accounts in exchange for vehicle services to be rendered by the participant service stations. The administrator may then issue voucher data to the members and associate the voucher data with member accounts. Members may redeem the voucher data at participant service stations, wherein the voucher data may be used to verify membership, authorize vehicle services at the participant service stations, and debit the member accounts. The participant service stations may thereafter send receipt data to the administrator, which may then reimburse the participant service stations for the rendered vehicle services.

BRIEF DESCRIPTION OF THE DRAWINGS

Features and advantages of the present invention will be apparent to those of ordinary skill in the art from the following detailed description of an exemplary embodiment and best mode of the invention, with reference to the accompanying drawings, in which.

DETAILED DESCRIPTION

In general, a system will be described in an illustrative embodiment of a method of facilitating vehicle service carried out on a prepaid and reimbursement basis. The embodiment will be described with reference to its use in an automobile servicing environment. However, it will be appreciated as the description proceeds that the invention is useful in many different applications and may be implemented in many other embodiments. In this regard, and as used herein and in the claims, it will be understood that the term "vehicle" refers not only to automobile applications, but also to other vehicle applications including but not limited to trucks, buses, recreational vehicles, and the like.

System

Figure 1:
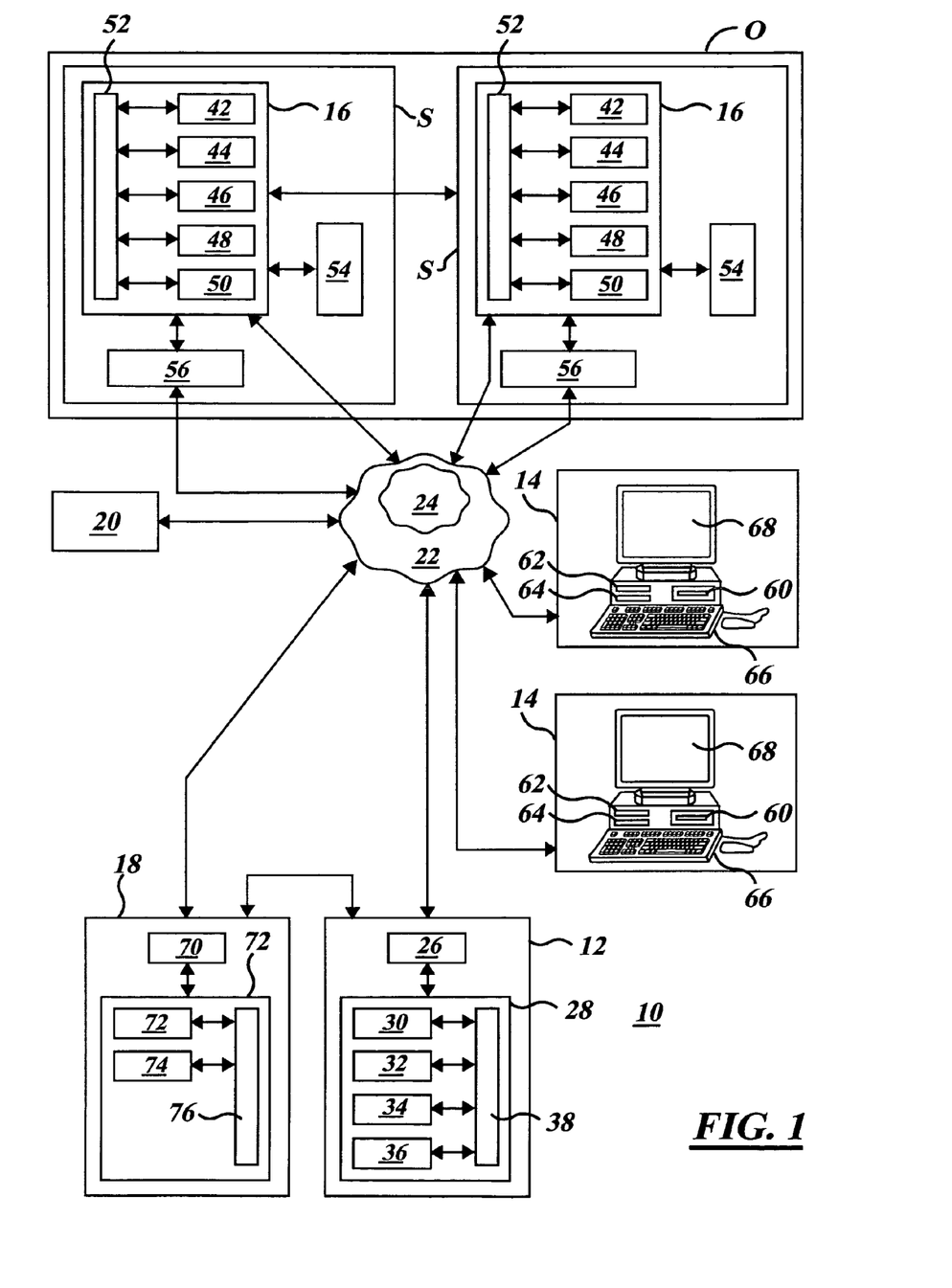
FIG. 1 is a block diagram according to an embodiment of a system for facilitating the marketing, redemption, and reimbursement of prepaid vehicle services in a vehicle service network.

Referring specifically to the drawings, FIG. 1 illustrates an embodiment of an operating environment, service network, or system 10 for implementing a computer-assisted method of facilitating the marketing, redemption, and reimbursement of prepaid vehicle services in a vehicle service network. The vehicle service network may include a plurality of vehicle service stations that are network participants, a network administrator, and a plurality of consumers who are network members.

The system 10 may include one or more of the following subsystems or system elements or components: one or more network administrators or centers 12 for receiving, processing, and transmitting data; one or more consumer computers 14 for receiving, processing, and transmitting data; one or more service organizations O that may include one or more service stations S having service station computers 16 for receiving, processing, and transmitting data; one or more web-hosting portals 18 for hosting a website; one or more third party enablers 20; and one or more communication networks 22 that may include the Internet 24 for providing communication among the various system elements. Those of ordinary skill in the art will recognize that the various computers described below may have hardware and software aspects in common, which will not be repeated for each computer description. Accordingly the descriptions of the various computers are mutually incorporated by reference.

Network Center

The network center 12 may include one or more physical locations. In one example, the network center 12 is a voice and/or fax call center, office, station, or the like. In an alternative or additional example, the network center 12 is a data processing center, office, station, or the like. In any case, the network center 12 provides verbal, data, and/or fax communications between a live human network representative in the network center 12 and a member or consumer via consumer computer 14, participant service station S via service station computer 16, and/or the like. The network center 12 and web-hosting portal 18 may be located in the same or different facilities.

In any case, the network center 12 may include one or more communication devices 26 such as modems, voice and data switches, or the like, and one or more network computers or servers 28, and one or more live network representatives, managers, and/or the like. The communication device 26 connects to the web-hosting portal 18 and/or communication network 22 and may transmit and receive voice, data, fax, and/or like transmissions over the network 10.

The network center 12 may be implemented as any suitable hardware and software capable of providing one or more of a variety of services including but not limited to member and participant enrollment, service station support, marketing, reimbursement, communication via data, voice, fax, and/or the like with the consumer computers 14, the service center computers 16, the web-hosting portal 18, and/or the third party enabler 20 via the communications network 22 or otherwise. In an exemplary implementation, the network server 28 may include a processor 30 and internal memory 32 for executing and storing computer applications, data files, and/or databases for managing and storing data supplied by the member or consumer computers 14, participating service stations 16, web-hosting portal 18, and/or third party enabler 20. The network server 28 may also include an input device interface 34, output device interface 36, and a communications module 38.

The communications module 38 may be any type of suitable device or module including a system bus, which couples the various above-described system components or modules. The communications module 38 may provide for data transmission internally between each of the elements in the server 28 and externally between the internal elements of the server 28 and any other elements external of the computer such as the communications device 26. The communications module 38 may represent one or more of any of several types of bus structures, including a memory bus or memory controller, a peripheral bus, an accelerated graphics port, a processor or local bus using any of a variety of bus architectures, and the like. By way of example, and not limitation, such bus architectures may include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, and the like.

The processor 30 may be configured to execute control logic that provides the functionality for at least a portion of the network center 12. In this respect, the processor 30 may encompass one or more processing units, controllers, microprocessors, micro-controllers, discrete logic circuit(s) having logic gates for implementing logic functions upon data signals, application specific integrated circuits (ASIC) with suitable logic gates, complex programmable logic devices (CPLD), programmable or field-programmable gate arrays (PGA/FPGA), any combinations of the aforementioned, and the like. The processor 30 may be interfaced with the memory 32, which is a medium configured to provide at least temporary storage of data and/or computer software or computer-readable instructions that provide at least some of the functionality of the system 10 and that may be executed by the processor 30. As used herein, the term processor also includes any ancillary devices such as clocks, power supplies, and the like.

The internal memory 32 may include computer readable storage or media in the form of removable and/or non-removable, volatile memory and/or non-volatile memory. Exemplary volatile memory may include random access memory (RAM), static RAM (SRAM), dynamic RAM (DRAM), and the like, for running software and data on the processor 30. RAM typically contains data and/or program modules that are immediately accessible to and/or presently being operated on by the processor 30. By way of example, and not limitation, the volatile memory may include an operating system, application programs, other memory modules, and data.

Exemplary non-volatile memory may include read only memory (ROM), erasable programmable ROM (EPROM), electrically erasable programmable ROM (EEPROM), dynamic read/write memory like magnetic or optical disks or tapes, and static read/write memory like flash memory, for storing software and data. A basic input/output system (BIOS) is typically stored in ROM for containing basic routines that help to transfer information between elements within the server 28, such as during server boot-up.

The server 28 may also include other removable/non-removable volatile/non-volatile data storage or media. For example and, although not shown in the figures, a mass external storage read/write device/module may be used in the form of a dynamic read/write hard disk drive that may read from or write to non-removable, non-volatile magnetic media. Also, a dynamic read/write device/module such as a magnetic or optical drive that reads from and writes to a removable, non-volatile device, such as a magnetic floppy disk, magnetic tape cassette, digital versatile disk, digital video tape, optical disk like a CD-ROM, or other optical media. Moreover, a static read/write module may be used in the exemplary operating environment for use with a static read/write device including, but not limited to, a flash memory card, integrated circuit chip, and the like.

The memory media/modules discussed above enable storage and communication of computer readable instructions, data structures, program modules, and other data for the computer. For example, the mass storage device may store an operating system, application programs, other program modules, and program data. Note that these components may either be the same as or different from the operating system, application programs, other program modules, and data of the internal memory 32 of the server 28. It is recognized, however, that such programs and components may reside at various times in different storage media associated with the server 28, and may be executed by the processor 30. Those of ordinary skill in the art will recognize that suitable computer programs may be installed or loaded into a secondary memory of a computer such as the mass storage device, dynamic storage device, or static storage device. Upon execution by the processor 30, such computer programs may be loaded at least partially into a primary memory such as the internal memory 32. Any suitable non-volatile memory interface may be used to connect the mass storage device and other memory modules to the communications module 38.

The input device interface 34 is provided to communicate with any suitable peripheral input devices, such as a pointing device (e.g., a mouse, trackball, pen, touch pad, or the like), keyboard, modem, internal card reader, and the like, that may be used to enter commands and information into the server 28. Those of ordinary skill in the art will recognize that such peripheral devices may be internal or external with respect to the server 28. Other input devices (not shown) may include a microphone, joystick, satellite dish, wireless communication device, scanner, or the like. The input device interface preferably connects the above described input devices, and possibly other input devices, to the processor 30 preferably via the communications module 38, but may be connected by other interfaces and bus structures, such as a parallel port, Universal Serial Bus (USB), infrared device, or the like.

The output device interface 36 is provided to communicate with peripheral output devices such as a printer, a monitor, or other type of display device or other peripheral device such as speakers (not shown), and the like, that may also be connected to the system bus 38 via the interface 36, which may be any suitable printer, video, etc., type of interface. Those of ordinary skill in the art will recognize that the peripheral devices are actually external devices with respect to the server 28.

As used herein, the term interface broadly means any suitable form of electronic device or adapter, or even a software module or adapter, which enables one piece of equipment to communicate with or control another. Any of the interfaces disclosed herein may conform to any suitable protocols such as Ethernet or field buses such as Profibus, Interbus, Devicenet, RS-232, parallel, small computer system interface, USB, wireless protocols such as Bluetooth, infrared, and the like, and any other suitable input/output (I/O) protocols.

Moreover, an interface in the context of a software architecture may include a software module, component, code portion, or other sequence of computer-executable instructions. Such an interface may include, for example, a first module accessing a second module to perform computing tasks on behalf of the first module. The first and second modules may include, in one example, application programming interfaces (APIS) such as provided by operating systems, component object model (COM) interfaces (e.g., for peer-to-peer application communication), and extensible markup language metadata interchange format (XMI) interfaces (e.g., for communication between web services). The interfaces may be tightly coupled, synchronous implementations such as in Java 2 Platform Enterprise Edition (J2EE), COM, or distributed COM (DCOM) examples. Alternatively, or in addition, the interfaces may be loosely coupled, asynchronous implementations such as in a web service (e.g., using the simple object access protocol). In general, the interfaces may include any combination of the following characteristics: tightly coupled, loosely coupled, synchronous, asynchronous, and the like. Further, the interfaces may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

The server 28 may operate in a networked environment as shown, wherein software modules and/or data used by the server 28, or portions thereof, may be stored in other computer(s) or a remote memory storage device (not shown) associated therewith or connected thereto. By way of example, and not limitation, remote application programs/data may reside in memory of a remote computer.

The network logical connections or communications may include a local area network (LAN) and a wide area network (WAN), but may also include any other suitable networks and connections. The LAN and/or WAN may be a wired network, a wireless network, a combination thereof, and the like. Such networking environments may be commonplace in offices, enterprise-wide computer networks, intranets, and global computer networks (e.g., the Internet or World Wide Web). When used in a local area networking environment, the computer is preferably connected to the LAN through the communications device 26 which may be a network adapter or interface. When used in a wide area networking environment, the computer preferably includes the communications device 26 which may be a modem or any other means for establishing communications over the WAN. The modem, which may be internal or external, is preferably connected to the communications module 38 via the input interface 34, or other appropriate arrangement. The network 22 and network connections shown are exemplary and other means of establishing a communications link between the various system elements or computers may be used.

In operation, the processor 30 is powered by a power supply (not shown) and initially operates on instructions stored in memory 32. The processor 30 may receive commands or data from a live network representative through one or more input devices, and receives, processes, and stores data or instructions from various storage media including the memory 32, and may output data or instructions to output peripheral devices.

Generally, such data processors are programmed to carry out computer-executable instructions, such as those associated with or embedded in software or computer programs such as operating systems, application programs, and the like. Computer programs or software may include executable instructions for implementing logical functions and can be embodied in any computer-readable medium for use by or in connection with a processor that can retrieve and execute the instructions. The software may include, but is not limited to routines, modules, objects, components, data structures, and the like, for performing particular tasks and/or implementing particular abstract data types. Computer programs may exist in a variety of forms both active and inactive. General examples include software programs comprised of instructions in source code, object code, executable code or other formats; firmware programs; or hardware description language (HDL) files; and the like. Specific examples include assembler, C, C++ objects, Visual Basic, Visual C++, XML, Java, and Microsoft® Foundation Classes, PERL, PHP, SQL, and the like.

As mentioned previously, the server 28 is adapted to use at least some form of computer readable media, which may include volatile and/or non-volatile media, removable and/or non-removable media, and which may be any suitable medium that may be accessed by a computer. By way of example and not limitation, computer readable media include computer storage media, communication media, and any combination thereof. The system and methods described herein may include these and other various types of computer-readable media wherein such media may contain, store, and/or carry instructions or programs for implementing some or all of the method steps described below in conjunction with the processor 30 or other data processor. At least some portion of the method may be practiced locally or in a distributed computing environment where tasks may be performed by remote computers or processing devices that are linked through a communications network, such as the LAN, WAN, or the like. In a distributed computing environment, program modules may be located in both local and remote computer storage media including memory storage devices.

Computer storage media may be used to distribute computer programs locally and may include volatile and non-volatile, removable and non-removable media implemented in any method or technology for storage of information such as computer readable instructions, program modules, data structures, other data, and the like. More specifically, computer storage media may include RAM, ROM, EEPROM, flash memory or memory sticks, integrated circuits, CD-ROM, digital versatile disks (DVD) or other optical disk storage, magnetic cassettes, magnetic tape, magnetic disk storage or other magnetic storage devices, or any other medium that may be used to store the desired information and that may be accessed by a computer.

Communication media preferably embody computer readable instructions, program modules, data structures, other data, and the like, in a compressed or uncompressed data signal such as a carrier wave or other transport means, and include any information delivery media. Those skilled in the art are familiar with modulated data signals, which have one or more characteristics set or changed in such a manner as to encode information in the signals. In any event, exemplary computer readable signals, whether modulated using a carrier or not, are signals that a computer system hosting or running a computer program can be configured to access, including signals downloaded using the Internet or other networks. Wired media such as a wired network or direct-wired connection, and wireless media such as acoustic, RF, infrared, and other wireless media, are examples of communication media. In a sense, the Internet itself, as an abstract entity, is a computer readable medium and the same is true of computer networks in general. It is therefore to be understood that the methods may be performed by any computing devices suitable for executing one or more of the specified functions, using any media and being located anywhere.

Service Stations

The service stations S may include the service station computers 16, which may be personal computers or the like. The service station computers 16 may include a network interface or communication device 56 such as a wired or wireless telephone or cable modem or the like for communicating with the communications network 22. The communication device 56 connects to the communication network 22 and may transmit and receive voice, data, fax, and/or like transmissions over the network 10.

The service station computers 16 may also include a processor 44 and a memory 46 for processing and storing data and a computer usable media including well known and widely available Internet browser and Internet-access computer programs for sending and receiving data over the communications network to the web-hosting portal. The processor 44 and memory 46 may also be configured to process and store computer usable media including a point-of-sale (POS) application program that will be described in further detail herein below. The service station computers 16 may also include an input device interface 48, output device interface 50, and a communications module 52.

The service station computers 16 may send service station data to the network center 12, consumer or member computers 14, web-hosting portal 18, and/or third party enabler 20 through a web-page interface using communication standards such as hypertext transport protocol (HTTP), transport-control protocol and Internet protocol (TCP/IP), and/or the like.

Moreover, the service station may include other devices such as any suitable input and/or output devices. More specifically, the service station may include member data input devices 54 such as bar code scanners for reading a member voucher card or keypad input devices for input of a member personal identification number (PIN), and facsimile cards 42 for transmitting member-signed authorizations, invoices, estimates, work orders, and/or the like to the network center 12. The fax cards 42 may be communicated to the communications modules 52 within the service station computers 16 as shown, but may also be external stand alone devices communicated with the computers 16 and the network 22, or may be independent of the computers 16 and in communication with the network 22.

Consumer Computers

The consumer computers 14 may be personal computers or the like, and may include a communication device 60 such as a wired or wireless telephone or cable modem or the like for communicating with the communications network. The consumer computers 14 may include processors 62 and memory 64 for processing and storing data and computer usable media such as well known and widely available Internet browser and Internet-access computer programs for sending and receiving data over the communications network 22 to the web-hosting portal 18. The consumer computers 14 may send consumer data to the web-hosting portal 18 through a web-page interface using communication standards such as hypertext transport protocol (HTTP), transport-control protocol and Internet protocol (TCP/IP), and/or the like. Moreover, the consumer computers 14 may include other devices such as any suitable input and/or output devices such as a keyboard 66, monitor, 68, and/or the like.

Communication Network

The communication network 22 may be any suitable local area network, wide area network including the Internet 24, or the like. The communication network 22 may include a wireless system, land network, any combination thereof, or the like, that is adapted to transmit and receive signals to and from one or more of the network center 12, consumer computers 14, service station computers 16, web-hosting portal 18, and/or third party enabler 20.

In one implementation, the communication network 22 may be a wireless carrier system including a wireless communications carrier, a mobile telephone system, satellite broadcast system, or the like, that incorporates any type of telecommunications in which electromagnetic waves carry signals over part of or an entire communication path. For example, the wireless carrier system may be implemented as a CDMA, GSM, or other cellular communication system, or any other suitable wireless system.

In another implementation, the communication network may be a land network used to connect the consumer computers, service station computers, web-hosting portal, network center, and/or third party enabler. As such, the land network may be a public-switched telephone network (PSTN), an Internet protocol (IP) network, wired network, optical network, fiber network, and/or any combination thereof. The land network may be connected to one or more landline telephones, facsimile machines, computers, or the like.

Web-Hosting Portal

The web-hosting portal 18 may include one or more communication devices 70 like data modems or the like for communicating with the communication network 22, and one or more web servers 72. The web-hosting portal 18 may be directly connected by wire to the network center 12. Or, the web-hosting portal 18 may be directly connected by phone lines, cable lines, and/or wirelessly to any suitable land network or wireless network, which is connected to the network center 12. For example, the web-hosting portal 18 may be connected to the network center 12 using the communications network 22.

The web server 72 may be implemented as any suitable hardware and software capable of providing web services to receive and transmit data from and to the consumer computers 14, the service center computers 16, the network center 12, and/or the third party enabler 20 such as via the communications network 22. In an exemplary implementation, the web server 72 may include a processor 74 and memory 76 for executing and storing computer applications, data files, and/or databases for managing and storing data supplied by the consumer computer 14, service station computer 16, network center 12, and/or third party enabler 20. As with the other computers disclosed herein, the server 72 may include a communications module 76.

The server(s) 72 of the web-hosting portal 18 may include dual, redundant hard disks, wherein files are backed up and archived nightly, weekly, and monthly. The web-hosting portal 18 may include Gig-E connections from ten or more major internet backbone providers and may include redundancy in power, network connectivity, HVAC, fire suppression, and security.

Third Party Enabler

The third party enabler 20 may be implemented as any suitable hardware and software capable of providing services via receiving and transmitting data from and to the consumer computers 14, the service center computers 16, the network center 12, and/or the web-hosting portal 18, such as via the communications network 22. One example of a third party enabler is the well known PayPal® system.

Software Architecture

Figure 2:
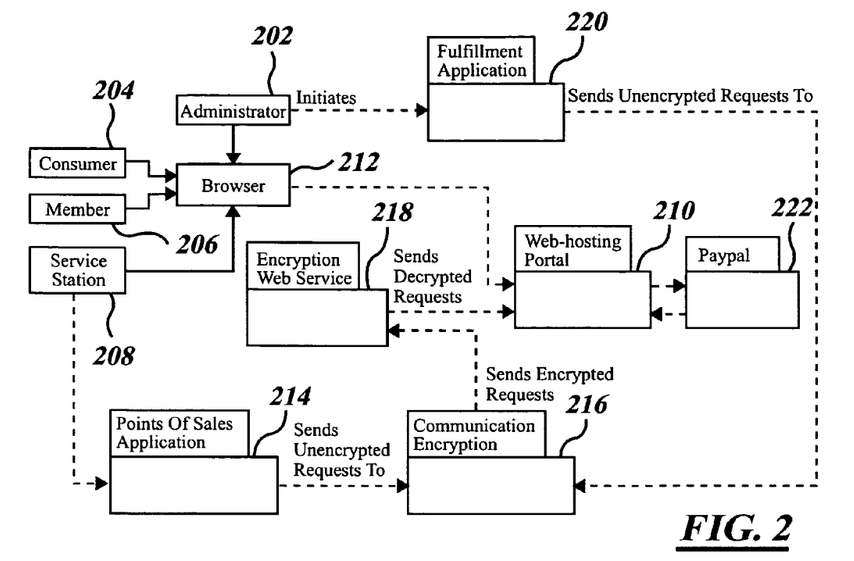
FIG. 2 is a block diagram of an exemplary software architecture for use in the system of FIG. 1.

FIG. 2 illustrates an exemplary domain object model that may be used with the previously described system 10. The software architecture is a high availability architecture, that may be run on Sun® brand computers, custom constructed, or any other suitable computing equipment, and may be enabled by Linux, Apache Webserver, MySQL database, PHP and Java application programs and web services, or any other suitable application programs.

A network administrator 202, consumers 204, members 206, and service stations 208 can access a web-hosting portal 210 (such as the web-hosting portal 18 of FIG. 1) through any suitable online web browser(s) 212. As shown, the service stations 208 can also access the web-hosting portal 210 through a point-of-sales application 214, which makes requests through a communications encryption library or package 216 and receives responses through an encrypted web service 218. Those of ordinary skill in the art will recognize that the features and functionality provided by the point-of-sales application 214 may also be hosted on the web-hosting portal 210 or network administrator 202 and communicated to the service stations 208 through the suitable web browser 212. As used herein, a web service is a collection of protocols and standards used for exchanging data between applications or systems located on a network or the Internet. Further, an encrypted web service communicates data that is intentionally obscured so that it is not readable by any unauthorized attempts.

The network administrator 202, acting through the browser 212, may access other elements of the system 10 through the web-hosting portal 210 or through a fulfillment application 220 of the network center 12 that also makes requests through the communications encryption package 216 and receives responses through the encrypted web service 218. The fulfillment application preferably retrieves a list of new members, creates welcome letters, marks the members as having been fulfilled, and assigns a barcoded key fob to each new member.

The web-hosting portal 210 includes software with all classes that interact with the browsers 212 accessible by consumers 204, members 206, service stations 208, and the administrator 202 or network center. Additionally, the web-hosting portal software includes all classes that receive requests from the encrypted communications library 216 and responds via the encrypted web service 218. Finally, the web-hosting portal 210 cooperates with third party enabler software 222 such as software of PayPal®, or the like.

Figure 3:
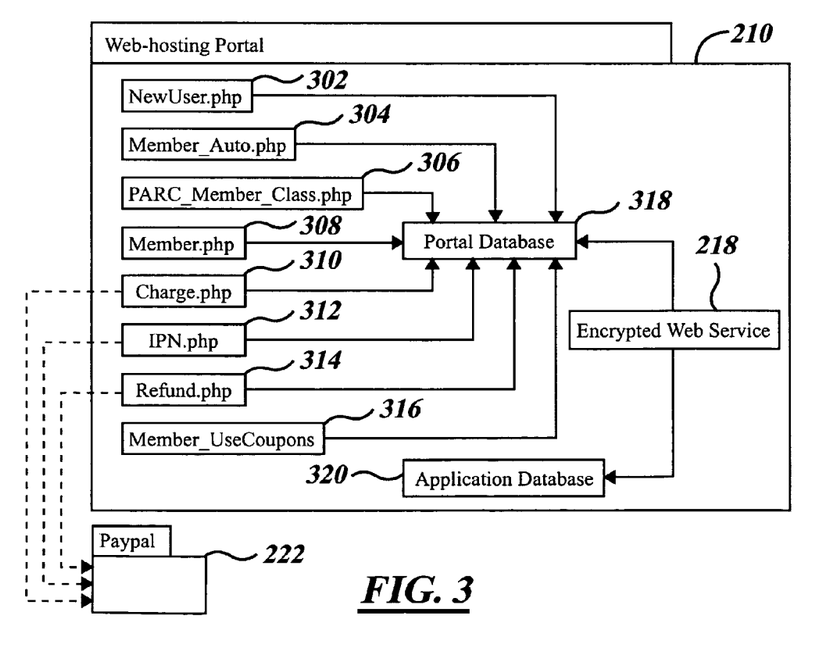
FIG. 3 is a block diagram of a portion of the software architecture of FIG. 2 including an exemplary web-hosting portal.

Referring now to FIG. 3, the web-hosting portal 210 may be enabled by Apache Webserver and MySQL Database, may use PHP Nuke (www.phpnuke.org), and may extend upon the basic software used in the system 10 through custom coded PHP programs. FIG. 3 illustrates an exemplary PHP relationship within the web-hosting portal 210. The PHP programs may be used to perform one or more of the following functions: allowing consumers to enroll into the network as members—NewUser.php 302; modifying vehicles owned by members—Member_Auto.php 304; modifying membership classifications—PARC_Member_Class.php 306; searching existing members—Member.php 308; modifying member demographic data—Member.php 308; invoking a third party enabler such as PayPal 222 to charge a member or service station credit card—Charge.php 310; performing an instant payment notification—IPN.php 312; refunding a member or service station credit card—Refund.php 314; carrying out redemption of a members voucher—Member_UseCoupons.php 316; and the like. The PHP files are stored in a portal database 318 that may be resident in the memory 74 of the web-hosting portal 18 of FIG. 1, wherein the portal database 318 is communicated to an application database 320 that may be resident in the memory 32 of the network center 12, via the encrypted web service 218.

Method

Consumer Enrolls as Member of Network

In an exemplary implementation, consumers may see advertising for the network and may wish to enroll in the network as members. In one example, a consumer may call a network representative at the network center 12 of FIG. 1, and enroll over the telephone, in person, or in any suitable manner. In another example, the consumer may enroll as a network member using any computer linked to the Internet 24, such as the consumer computer 14 of FIG. 1. In any case, membership data associated with the consumer or member is stored in a suitable member account in any suitable database(s), such as in one or both of the network center 12 or web hosting portal 18. As used herein, the term member account may include any suitable data record, and/or the like, that includes demographic data, financial data, and/or the like. Also as used herein, the term database includes any suitable data file, module, and/or the like, stored in any suitable memory of the system 10.

Using any suitable Internet browser carried by the consumer computer 14, a consumer may navigate the Internet 24 to arrive at a website home page of the network center 12 that is hosted by the web-hosting portal 18. From the home page, the consumer may select an "enroll now" button to activate the NewUser.php program. The NewUser.php program may define and initialize suitable variables, display a data entry form, save entered data upon successful data addition or editing, call a credit card processing program, and update member records upon a suitable response from a credit card charging attempt. Upon initial execution, the NewUser.php program displays a member data screen including a demographics form. Upon any subsequent executions, the program may make it possible for a member to edit data, display any error messages, and update the database with new member data.

At the member information screen, the consumer may fill out the form to include demographics data including: last name, first name, address, city, state, zip code, home phone number, mobile phone number, work phone number, pager number, fax number, email address, one or more PIN's, and a verification phrase such as last four numerals of the consumers social security number, driver's license number, and/or the like. In response a member code may be assigned automatically and the Member_Auto.php program may be initialized, wherein the consumer may fill out a vehicle data form including vehicle data such as make, model, year, mileage, and vehicle identification number.

Then, membership fees may be received from the members in exchange for membership in the network, and prepaid vehicle service fees may received from the members in exchange for vehicle services to be rendered by service stations participating in the network. The member accounts are accordingly credited in amounts corresponding to the amounts of the prepaid vehicle service fees. The vehicle services may be discounted, wherein the prepaid vehicle service fees may be sold by the network administrator to consumers at any suitable discount, such as 10% or any suitable discount amount.

As will be discussed in detail below, the consumer may select a pay now button, which calls a credit card charge script and passes suitable codes so that a PayPal callback knows who and what any given payment was for. Alternatively, if the consumer does not want to use PayPal, the consumer may select another payment alternatives button. In this alternative flow, a screen may instruct the consumer to print the member data screen, list the address of the network administrator, and ask the consumer to remit a check or money order of a predetermined amount to the listed address. Upon receipt and cashing of the payment, the network representative may use the web portal to look up the member identification, set an eligibility date to the current date, and set a fulfillment switch to "yes".

Fulfill Membership

The fulfillment application of the network center includes all suitable classes that communicate with a suitable web-hosting portal database through the communication encryption package, retrieves a list of members to be fulfilled wherein fulfillment switches associated with these members is set to "yes", and prints fulfillment letters to new members.

A manager or representative of the network administrator issues voucher data to a member and the fulfillment application is used to associate the member and member data with the voucher data, which is then stored in any suitable database. The voucher data could be manifested in a barcode card or keychain tag for convenient use by a member. The voucher data could also be manifested in any tangible article such as a tag, card, key fob, or the like, as any type of optical mark that may be scanned by any optical mark reading or sensing device, or any type of radio frequency (RF) tag that may be scanned by any suitable RF scanner, or any other machine readable code that may be read by a scanner. As used herein, the terminology voucher data includes a physical voucher article with data therein and/or intangible data such as a code, PIN, password, and/or the like.

Then, manager or representative may use the fulfillment program to mark each member data file, record, or account as having been fulfilled such as by setting fulfillments switches to "no" and populating the fulfillment date with the current date, and may thereafter print a fulfillment report of all members for whom a fulfillment letter and voucher data was just created.

A manager of the network administrator preferably associates the vouchers to the members in the following manner. The manager compares each fulfillment letter to the printed report, checking off each letter as manually processed. For each letter, the manager looks up the member record on the portal database, selects a random unused voucher or barcode tag, selects an "edit member" button, selects or highlights a barcode tag data field, and scans the voucher or barcode tag to enter its data into the member's record. Finally, each member is issued voucher data. For example, the manager may stuff the letter, voucher data or barcode tag, and any other suitable materials into an envelope addressed for each member and mails the envelopes to the new members. Alternatively, those of ordinary skill in the art will recognize that the members may be issued voucher data and other information using the network system, such as via email, or the like.

Credit Card Processing

Any suitable third party payment system may be used, such as PayPal, to process credit card, debit card, or the like transactions wherein a consumer may buy into network membership and/or a network member may buy prepaid automotive services, or the like. A credit card transaction may triggered such as from the NewUser.php program, and the Charge.php and IPN.php programs may be used to implement the credit card processing routine. The Charge.php script may receive and kick off the charging process, wherein suitable calling modules may pass item number and price to Charge.php, which may wrap this data in a button it may build to allow the user to initiate the charge process. The IPN.php script may receive and process an instant payment notification from PayPal.

Figure 4:
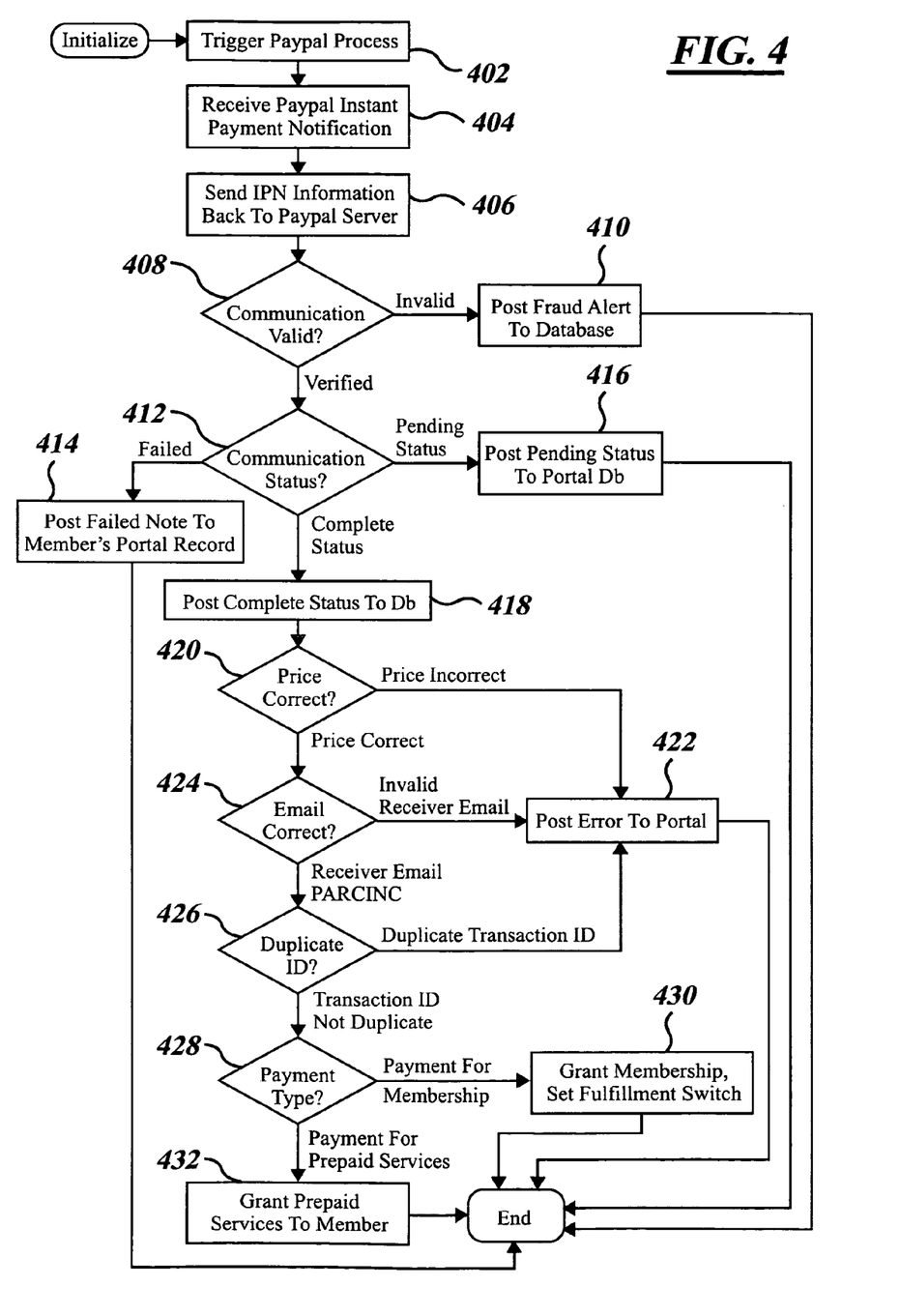
FIG. 4 is a flow chart of a portion of an exemplary embodiment of a method for use with the system of FIG. 1 and including an exemplary payment process.

A PayPal-enabled implementation of a credit card process 400 is illustrated in FIG. 4. The PayPal-enabled process 400 may be triggered at step 402 in any suitable manner, such as through a "check out and pay" button. Thereafter, at step 404, a PayPal instant payment notification (IPN) signal with encrypted code is received from PayPal. Those of ordinary skill in the art will recognize that detailed information on PayPal IPN (i.e. IPN integration guide) may be obtained from PayPal and/or PayPal developer forums on the Internet.

The IPN data with encrypted code is then relayed back to PayPal at step 406. Exemplary PHP code is provided below.

```
// read the post from PayPal system and add 'cmd'
$req = 'cmd=_notify-validate';
foreach ($_POST as $key => $value) { $value =
urlencode(stripslashes($value)); $req .= "&$key=$value";
}
```

-continued

```
    // post back to PayPal system to validate
    $header .= "POST /cgi-bin/webscr HTTP/1.0\r\n";
    $header .= "Content-Type: application/x-www-form-
urlencoded\r\n"; $header .= "Content-Length: ". strlen($req)
. "\r\n\r\n"; $fp = fsockopen ('www.paypal.com', 80, $errno,
$errstr, 30);
    // assign posted variables to local variables $item_name =
$_POST['item_name'];  $item_number  =  $_POST['item
number'];  $payment_status  =  $_POST['payment_status'];
$payment_amount      =     $_-      POST['mc_gross'];
$payment_currency   =   $_POST['mc_currency'];   $txn_id   =
$POST['txn_id'];
    $receiver   email    =    $   POST['receiver   email'];
$payer_email = $_POST[- 'payer_email'];
    if (!$fp) {
    // HTTP ERROR
    } else {
    fputs ($fp, $header . $req);
    while (!feof($fp)) {
    $res = fgets ($fp, 1024);
    if (strcmp ($res, "VERIFIED") == 0) {
    // check the payment_status is Completed
    // check that txn_id has not been previously processed
    // check that receiver_email is your Primary PayPal
email
    // check that payment_amount/payment_currency are
correct
    // process payment
    }
    else if (strcmp ($res, "INVALID") == 0) {
    // log for manual investigation
    } }
    fclose ($fp);
    } ?>
```

At step 408 it is determined whether the communication is invalid or verified. If invalid, and as shown in step 410, a fraud alert may be posted to the portal or network center databases, and the process thereafter terminates.

If valid or verified, however, it is determined at step 412 whether the status is failed, pending, or complete. If failed, then at step 414 a note to this effect is posted to the member's record, and the process thereafter terminates. If pending, then the pending status is posted to the portal database at step 416 and the process terminates for the time being. If complete, then at step 418 the complete status is posted to the portal database and the PayPal IPN form name "item_number" may be used to track purchase item details. This form name may map back to a portal database table, which has a unique numeric code, an indicator referring to the type of purchase (membership or prepaid service), and the key to that table such as a member identification number for a membership purchase, or one or more service codes for prepaid service purchases.

Thereafter, it is determined at step 420 if the price is correct for the type of purchase. If not, then a suitable error message is posted to the portal at step 422, and the process thereafter terminates. If so, then at step 424 it is determined whether the receiver email is correct. If not, then at step 422 a suitable error message is posted to the portal, and the process thereafter terminates. If so, then it is determined at step 426 whether the transaction identification is a duplicate. If so, then an error message is posted to the portal at step 422, and the process thereafter terminates. If not, then at step 428 the type of payment is determined. If the payment is for membership, then at step 430 membership is granted and a fulfillment switch is set to yes, and the process thereafter terminates. If the payment is for prepaid services, then at step 432 such services are granted to the member and associated with the barcode tag in the database, and the process thereafter terminates.

Service Station Enrolls as Network Participant

In an exemplary implementation, a service station may be solicited by the network administrator or may approach the network administrator wishing to enroll in the network as a participant service station. In one embodiment the service station may initiate enrollment as a network participant using any computer linked to the Internet. Alternatively, a service station may call the network administrator and initiate the enrollment process with a network representative over the telephone, in person, or in any suitable manner.

In any case, the network representative at the network administrator provides the service station with network benefits and enrollment requirements such as an application and screening process. In one implementation, the network performs a pre-screening of potential participant service stations. In the event the service station passes the screening, the network will offer the service station a paper application. The service station completes a detailed paper application and submits a check or money order to the network administrator. It is also contemplated that at least a portion of the application process could be carried out at least partially electronically using fax equipment, email, PayPal, other portions of the network 10, and/or the like. In any case, participant data associated with the service station is stored in a suitable participant account in any suitable database(s), such as in one or both of the network center 12 or web hosting portal 18. As used herein, the term participant account may include any suitable data record, and/or the like, that includes demographic data, financial data, and/or the like.

In either case, a manager at the network administrator reviews the application for compliance with any suitable predetermined criteria and screens the service station by conducting or ordering a background check on the service station. The background check may include checking with government authorities, the Better Business Bureau, or ordering an investigation by a third party, and/or the like. If the outcome of the background check is favorable, then the network manager cashes the check or otherwise receives payment in the form of participant fees from the service station in exchange for accepting, enrolling, and/or maintaining the service station in the network as a participant service station by creating a participant account for the service station and sending a welcome letter, instructions, and network access codes to a manager or general manager associated with the service station. In any case, data associated with the service station is stored in any suitable database(s), such as in one or both of the network center 12 or web hosting portal 18.

Additionally, the network manager may insert an audit trail function to the service station participant account that may maintain a history of every communication and transaction associated with the service station that occurs within the web-hosting portal and/or network center. Thereafter, a user such as a manager or customer service representative (CSR) associated with the service station may use the access codes to access the network via the Internet, perform account maintenance, and view the audit trail.

Finally, some or all of the participant fees may be used by the network administrator in marketing the vehicle service network to prospective consumers. In other words, the network administrator may pool participant fees and thereby, leverage multiple service station resources, to achieve relatively wide-scale advertising and sales of prepaid vehicle services.

Member Redeems Voucher to Receive Vehicle Service

A member may choose any participating service station within the network. Such service stations are those which have been enrolled and which are current on their monthly participant network fees. A member may find a participating service station by using the network administrator web site, by viewing an advertisement of a participant or of the network, or by any suitable manner. In any case, the member may arrive for service and preferably presents the member's network voucher, but may also or instead present the voucher data such as member name and PIN on the network.

From here, a CSR at the service station may log into the network system using the point-of-sales application or using a suitable browser. At this point the web-hosting portal may check to see if the service station is up to date with its participant fees or within a grace period of for example 14 days or so. If not, then network access may be denied the participant service station wherein a message is presented to the CSR to pay the outstanding network fees. If the service station is within the grace period, then a message may be presented to the CSR to pay the participant fees immediately.

If the service station is not paid up, then the network representative at the network administrator may notify members who have visited that service station or who live or work near (e.g. within a predetermined number of miles from) the service station, that the service station is currently unavailable to members in the network. For example, the network representative may send an email message to such members, or letters, or the like. It is also contemplated that the network computer 28 may run a program to automatically output such messages or letters to such members, using a list of unpaid service stations as input. The program would accept the list of unpaid service stations, cross-reference that list with a list of such members, and automatically generate email messages to be mailed automatically or letters to be printed, stuffed in envelopes, and mailed by hand, or the like.

If the service station is paid up, then the CSR may now verify membership of the member and authorize use of the member's network voucher for at least some of the prepaid vehicle services using the point-of-sales application or a suitable browser in communication with the web-hosting portal. The point-of-sales application preferably displays a text box that is password protected, wherein the CSR can scan the member's bar-coded voucher, or manually input the voucher data, to populate the text box. In one exemplary implementation, it may also be desirable to have the CSR present the member customer with a keypad input device to allow the member customer to enter their PIN, or other suitable membership data.

Thereafter, the POS application checks the portal database for prepaid services belonging to the member. All of the unused prepaid services belonging to the member will be returned and listed for selection by the CSR. The CSR then informs the member of the services available, the member requests the services the member desires to have performed at that time, and the CSR selects those services to be debited from the member's account.

Thereafter, the point-of-sales application sends an authorization request to the web-hosting portal and the portal responds with acceptance or rejection of the request. If the request is denied, an error message may be presented to the CSR explaining the problem. But if the authorization request is accepted, the web-hosting portal may mark the service as authorized for the member, debit the member's account for the prepaid services, and may set the identification of the service station in a data table associated with the member. The service station may then perform the service for the member.

Thereafter, the CSR may use the point-of-sales application to indicate that service is complete to initiate printing of a receipt for the member's signature. The receipt may include all suitable identifying or authorization data including member's signature, date, service station identification, member identification, and identification of services performed. Also, the receipt may be in tangible written form or may also be in electronic form for electronic communication between the service stations and the network center.

It is contemplated that any suitable aspects of this method may be carried out in conjunction with the assistance of a network representative at the network administrator over the telephone.

Service Station Reimbursed

The service station CSR sends receipt data, which may include a signed or otherwise authorized receipt of the member, to the network administrator for reimbursement. A network representative at the network administrator receives the signed receipt and cross-references it against the member's record in the portal database. If the services indicated on the receipt have in fact been marked as used in the member's record, then the network representative reimburses the service station. For example, the network representative may credit a network account of the service station via a third party enabler such as PayPal or otherwise, or mail a check or money order to the service station, and/or the like.

Member Requests Refund

In some cases, a member may request a refund of their membership fee and/or their prepaid services fees. In either case, a member may log into the web-hosting portal using their computer and browser. The member may fill out an appropriate web form to send the network representative a request for a refund of membership or service fees.

The network representative receives the request and determines whether any services have been used. If so, then the network representative sends a denial of refund request to the member via email to the member's listed email address. If no services have been used and the request is for a refund of membership fees, then the network representative terminates the membership and forwards the request with the member email to a manager at the network administrator. If no services have been used and the request is for a refund of prepaid fees, then the representative cancels all prepaid services and forwards the request with the member email to the manager at the network administrator. Upon receipt of requests for refunds, the network manager authorizes the refunds, and sends an email to the former member acknowledging the refund. The refunding may be handled using a third party enabler, such as PayPal, similar to the credit card charging process described previously. In other words, the network manager may reverse the charge(s) to the members credit card account.

Additional Point-of-Sales Features

In addition to receiving prepaid services, a member may also wish to inquire into and possible receive other services at the point-of-sale at the service station. Among other features, the point-of-sales application also allows the service station CSR to initiate, complete, and modify estimates for vehicle service, create diagnostic inspection sheets and service checklists for a technician, enter recommendations, print an invoice, and finalize the invoice upon receiving payment from the member. The POS application also includes service estimate and/or invoice override and/or confirmation features that are aimed at preventing or reducing the likelihood of service station fraud. Accordingly, the POS application was developed to establish industry best practices and provide those practices to participant service stations.

Figure 5A:
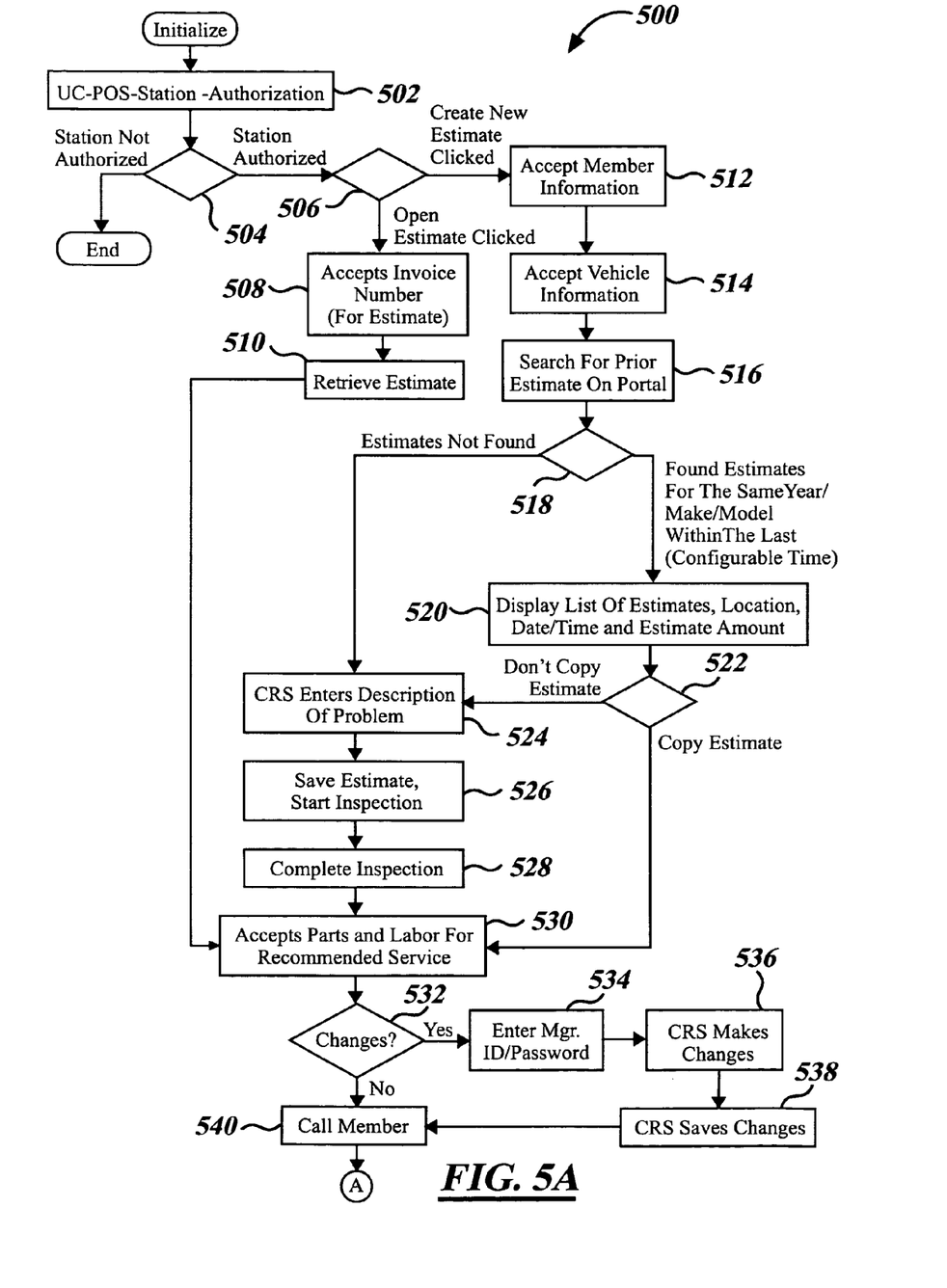
FIGS. 5A and 5B collectively represent a flow chart of another portion of the exemplary embodiment of the method for use with the system of FIG. 1 and including an exemplary service station point-of-sales process.
Figure 5B:
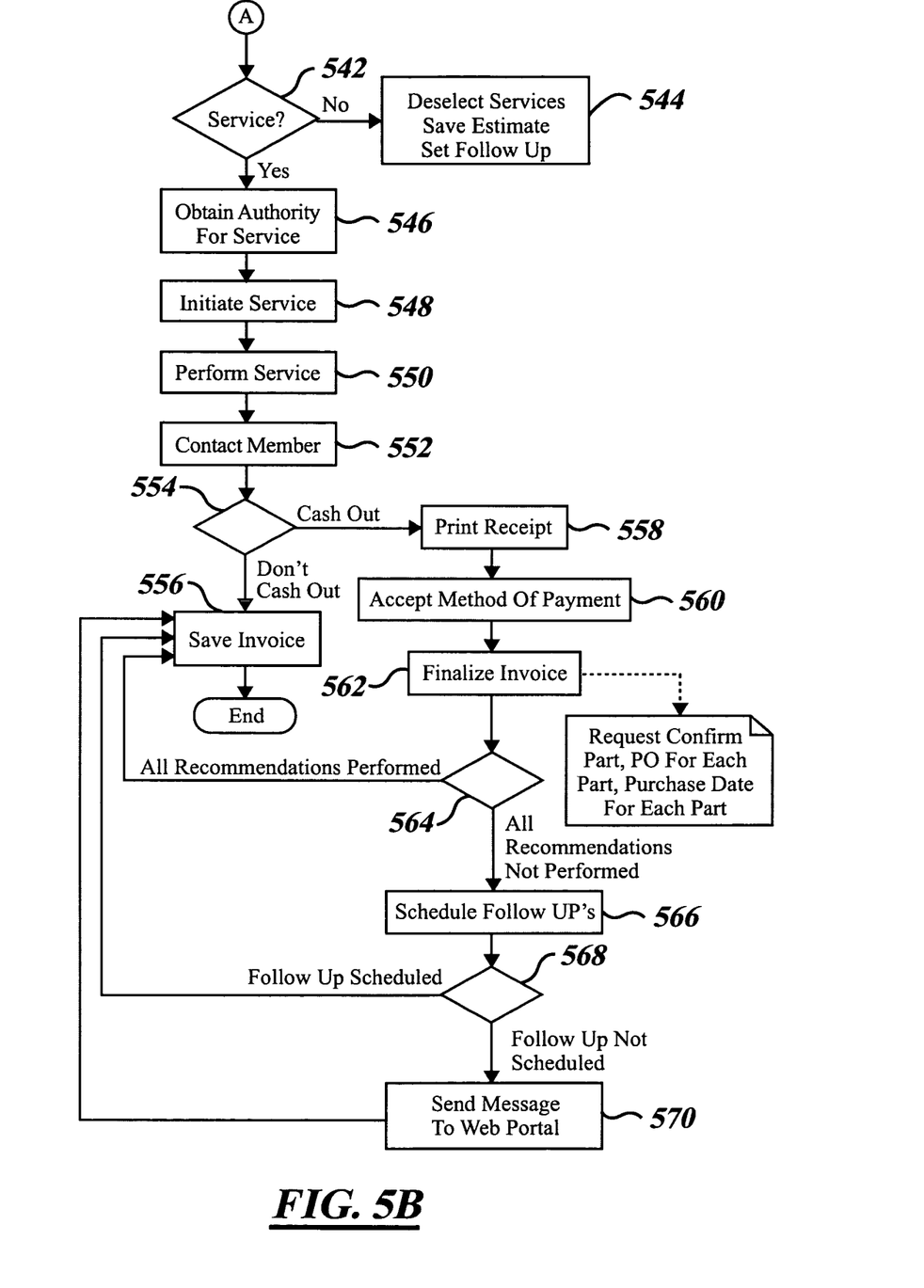

FIGS. 5A and 5B illustrate an exemplary process 500. At step 502, the CSR logs into the POS software as described previously to receive authorization. At step 504, it is determined if the station is authorized. If the station is not authorized, then the process ends. If the station is authorized, then the process goes to step 506 wherein it is determined whether the CSR wants to open a pending estimate or wants to initiate a new estimate. If the CSR selects an "open estimate" button, then the process moves to step 508 wherein the CSR may enter an existing estimate invoice number or other suitable data identifying the estimate. At step 510, the POS software retrieves the estimate from memory, and the method proceeds to step 530.

If, however, at step 506 the CSR selects a "create new estimate" button, then the method proceeds to step 512. At step 512, the CSR may enter customer identification into the POS application, such as phone number, last name, etc. Similarly, at step 514, the CSR may enter vehicle identification into the POS application. At step 516, the POS software searches existing estimates created for the particular member and vehicle within a predetermined period of time, e.g. the last year, if any exist. At step 518, it is determined if any such estimates exist. If so, at step 520, the POS software displays a list of the estimates including location, date/time, and the estimate amount. At step 522, it is determined whether the CSR wants to copy any existing estimates so as to add to or modify an existing estimate, or if the CSR may want to create or initiate a new estimate. If the CSR wants to create a new estimate, the method proceeds to step 524. If the CSR wants to use the existing estimate, the method proceeds to step 526.

From step 518, if no estimates are found, then the method proceeds to step 524. At step 524, if a CSR needs to create a new estimate, then the CSR enters the member's description of the problem with the vehicle. If the source of the problem is not known, then the CSR selects a diagnostic check box and adds an appropriate amount of labor to perform a diagnosis of the vehicle problem to identify the problem source. If the source of the problem is known, then this portion of the step may be skipped.

At step 526, the CSR saves the diagnostic estimate, prints the diagnostic estimate and an associated inspection sheet, and logs out of the POS application. At this point, the member then signs the estimate, retains a copy, and leaves the vehicle with the service station for inspection, and the CSR gives the inspection sheet to a technician at the service station.

At step 528, the technician reviews the member's vehicle, fills out the inspection sheet, and returns the completed inspection sheet to the CSR.

At step 530, the CSR logs back into the POS application, accesses the member's records or account as described previously, and selects the pending estimate for modification. In developing the details of the estimate, the CSR may use experience, consult with a standard vehicle servicing and pricing manual, or the like.

In any case, the CSR enters cost of recommended labor in increments of half-an-hour and enters cost of recommended materials, like parts and shop supplies, such as by selecting a material description, material vendor, and/or material code from a predetermined list of available materials. If a description, vendor, and/or code of a desired material is not in the predetermined list, then the CSR may select an "add new" material using the POS software interface.

As the labor and materials costs are added, the POS application displays a running total. But prior to totaling, a parts portion of the materials is marked up based on cost according to the following exemplary Table 1.

TABLE 1

| Parts Cost | Mark Up |
|---|---|
| $0-$100 | 100% |
| $100-$200 | 75% |
| $200-$300 | 50% |
| $300-$400 | 40% |
| above $400 | 33% |

Similarly, a shop supplies portion of the materials cost is calculated based on the subtotal of labor and marked up parts according to the following exemplary table 2.

TABLE 2

| Parts/Labor Price Range | Shop Supplies % |
|---|---|
| Up to $1,000 | 3% |
| Above $1,000 | 2.5% |

The running total is calculated as: total=parts+parts markup+labor+shop supplies+sales tax on materials. It is contemplated that labor rate, parts and supplies markups, and tax are configurable within the POS application. All entered labor and materials data are then saved in memory.

In step 532, it is determined whether any changes in labor, materials, and/or price need to be made. If so, then the process goes into an override mode starting at step 534. In step 534, a service station manager enters his identification and password to allow override of the estimate data. In step 536, the CSR edits the labor and/or materials quantity, price, and/or like data. In step 538, the CSR saves the override changes wherein the changes are saved and also automatically sent via a message, such as an email message, to the service station manager and/or to the network manager. Thereafter, the process returns to step 540. The override feature is considered a precautionary measure to prevent or reduce the likelihood of service station fraud at the CSR and technician level.

If, at step 532, no changes are necessary, then the process goes directly to step 540. At step 540, the CSR calls the member to discuss the results of the estimate, explaining mandatory service items and recommended service items. The CSR can deselect individual items to cause an associated line item amount to be deducted from the total for on the fly estimating while speaking with the member. It is contemplated that the override loop of steps 534 through 538 could be adapted for use here in the process as well.

In step 542, it is determined which, if any, services the member would like to have performed. If the member does not want any services performed, then the method proceeds to step 544.

At step 544, the CSR may deselect all service items and save the estimate. The POS software then prompts the CSR to schedule follow-up with the member regarding any or all of the unselected services. The CSR may enter a follow-up date that the POS software may use to automatically prompt the CSR in the future to call the member or mail the member a reminder.

If, at step 542, it is determined that the member wants some or all service, then the method proceeds to step 546. At step 546, the CSR obtains member authorization for some or all services. The CSR enters the member's authorization code, such as the last four digits of the member's social security number, the member's full driver's license number, and/or member's signature. Any services the customer declines, may be deselected by the CSR. The CSR then saves the estimate, and the POS software then prompts the CSR to schedule follow-up with the member regarding any or all of the unselected services. The CSR may enter a follow-up date that the POS software may use to automatically prompt the CSR in the future to call the member or mail the member a reminder.

At step 548, service is initiated when the CSR prints the finalized estimate and an associated technician work order, and logs out of the POS application. At this point, the member then signs the estimate, retains a copy, and leaves the vehicle with the service station for vehicle service, and the CSR gives the work order to a technician at the service station.

At step 550, the technician reviews the work order, performs the indicated service, makes changes to the work order if necessary, and returns the completed work order to the CSR upon completion of all service items.

At step 552, the CSR reviews the work order, logs into the POS application to change the estimate if necessary, and contacts the member for vehicle pick up.

At step 554, upon arrival of the member, the CSR logs into the POS application and opens the member's file, and it is determined whether the customer wishes to cash out. If not, then the CSR saves the invoice at step 556. If so, then at step 558 the CSR selects a "cash invoice out" button.

Then at step 560, the member renders payment to the service station in any suitable manner, wherein the POS application may record the type of payment made, such as credit card, check, cash, or the like.

Thereafter, at step 562, the CSR finalizes the invoice, wherein the POS application requests the CSR to confirm one or more of the following service information for each line item of the invoice: vendor information for each material used during the rendered vehicle service, a purchase order number for each material used, and/or a date of purchase for each material. The confirmation feature is another precautionary measure to prevent or reduce the likelihood of service station fraud at the CSR and technician level.

At step 564, it is determined whether all recommended service was authorized and performed. If so, then the CSR may proceed to save the invoice at step 556. If not, then at step 566, the CSR asks the member if the service station may schedule a follow up communication with the member to remind the member that the service is recommended for the vehicle.

At step 568, it is determined whether the follow up was scheduled. If not, then at step 570 a message indicating a lack of follow up is sent the web-hosting portal. If so, then the CSR may enter a suitable follow up date before the invoice is saved at step 556.

Follow-Ups

As has been discussed above, the POS application may be configured to remember vehicle service follow up reminders to members. For example, the CSR may select a "follow ups" button of the POS application to list all scheduled follow ups in the system. The follow ups may be listed in descending order starting with the oldest follow up. The CSR may select any given follow up to open an associated previously entered estimate. Thereafter, the CSR may contact the member to schedule a service appointment, reschedule another follow up communication, cancel follow ups altogether for that member, or the like. The CSR enters information in a "reasons" field to indicate why the customer has cancelled or rescheduled the follow up.

Daily Start and Cash Audits

A service station manager may wish to perform a cash audit to verify a cash drawer amount balance. But first, each morning the manager enters a daily beginning balance in the POS application. For example, the manager may log into the POS application first thing in the morning. From a main menu, the manager may select a "utilities" button to access a utilities screen. From there, the manager may select a "daily start" button which invokes a screen requesting the manager to count and enter the amount of beginning cash in the service station cash drawer. The POS application may require that the current POS user have a certain security level, such as level 4, which may be associated with the manager. The manager enters the amount into the POS application and selects an "ok" button to complete and save the daily start data.

Thereafter, any time during the day, the manager may log in to the POS application to perform a cash audit. The manager may select a "utilities" button from a main menu in the POS application to access a utilities menu screen. Thereafter the manager may select a "cash audit" button from a utilities menu, whereafter the POS application sums cash sales for the day and beginning cash amount and return the total amount. Again, the POS application may require the user to have a service station manager level 4 access. Then, the manager may compare the total amount to the actual amount in the cash drawer in the service station.

Maintain Organizations

A general manager of the network administrator may use the POS application to establish an organization and one or more service station locations associated with the organization. This functionality allows service stations to work independently or within an organization and allows the network administrator to service the organization and its service stations.

The general manager may log into the POS application and select a utilities button from a main menu screen. From here, the general manager may select a "maintain organizations" button to access a maintain organizations screen. Thereafter, the general manager may select an organization from a list of organizations to access an organizational detail screen. From there, the general manager may add a location by selecting an "add location" button associated with the selected location. Accordingly, a location screen appears wherein the general manager may enter location information for each location associated with the selected organization including name, geographic location, users, and/or the like. Then, the general manager may select an "ok" button to complete and save the entry.

Similarly, upon accessing the organization screen, the manager may select a "delete organization" button to access a "delete organization" screen. Thereafter, a list of all organizations is presented to the general manager who may then select one or more organizations to be deleted. Then, the manager may select an "ok" button to complete and save the deletions. Additionally, the general manager may delete a single location from an organization by selecting the desired locations from the organization screen and selecting a "delete" button.

Likewise, upon accessing the organization screen, the manager may select a "modify organization" button to access a "modify organization" screen. Thereafter, a list of all organizations is presented to the general manager who may then select a location to be modified and thereby access a user screen that displays demographic details about the selected location. The general manager may then modify data, such as name, geographic location, users, and the like. Then, the general manager may select an "ok" button to complete and save the modifications.

Maintain Users

A service station manager may wish to modify a user account for their service station location. The manager may log into the POS application and select the utilities button to access the utilities screen. Then the manager may select an "add user" button to access an add user screen or fields. Thereafter, the manager may add demographic information for each user including name, user identification, security level, and/or the like. The security level may be a lower setting such as 2 for a CSR and a higher setting such as 6 for a general manager. Then, the manager may select an "ok" button to complete and save the entry.

Similarly, upon accessing the utilities screen, the manager may select a delete user button to access a delete user screen. Thereafter, a list of all users is presented to the manager who may then select one or more users to be deleted. Then, the manager may select an "ok" button to complete and save the deletions.

Likewise, upon accessing the utilities screen, the manager may select a modify user button to access a modify user screen. Thereafter, a list of all users is presented to the manager who may then select a user to be modified to access a user screen that displays demographic details about the selected user. The manager may then modify data, such as name, user security level, and the like. Then, the manager may select an "ok" button to complete and save the modifications.

With either of the maintain organizations or the maintain users functions discussed above, the POS application may be configured to deny access to those locations or organizations for non-payment to the network administrator. For example, upon initialization, the POS application may check with the web-hosting portal to verify if the initializing location is up to date with its participant fees or at least within their grace period. If not, then the POS application may enter a suspend mode to prevent any further network functionality.

CONCLUSION

The system may include any instrumentality or aggregation of instrumentalities operable to compute, classify, detect, display, handle, originate, manipulate, manifest, process, record, reproduce, receive, retrieve, switch, store, or utilize any form of data, information, intelligence for academic, business, production, scientific, or other purposes. Although described in connection with an exemplary computing system environment, including a computer, the disclosed system and method are operational with numerous other general purpose or special purpose computing system environments or configurations. The computing system environment is not intended to suggest any limitation as to the scope of use or functionality of the system or method. Moreover, the computing system environment should not be interpreted as having any dependency or requirement relating to any one component, or combination of components, illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, personal digital assistants, mobile telephones, network PCs, minicomputers, mainframe computers, distributed computing environments that include any of the above systems or devices, and the like.

As used in the sections above and claims below, the terms "for example," "for instance," and "such as," and the verbs "comprising," "having," "including," and their other verb forms, when used in conjunction with a listing of one or more components or other items, are each to be construed as open-ended, meaning that the listing is not to be considered as excluding other, additional components, elements, or items. Other terms are to be construed using their broadest reasonable meaning unless they are used in a context that requires a different interpretation. When introducing elements of the present invention or the embodiments thereof, the articles "a," "an," "the," and "said" are intended to mean that there are one or more of the elements.

It is to be understood that the invention is not limited to the particular exemplary embodiments disclosed herein, but rather is defined by the claims below. In other words, the statements contained in the foregoing description relate to particular exemplary embodiments and are not to be construed as limitations on the scope of the invention as claimed below or on the definition of terms used in the claims, except where a term or phrase is expressly defined above. And although the present invention has been disclosed in conjunction with a limited number of presently preferred exemplary embodiments, many others are possible and it is not intended herein to mention all of the possible equivalent forms and ramifications of the present invention. Other modifications, variations, forms, ramifications, substitutions, and/or equivalents will become apparent or readily suggest themselves to persons of ordinary skill in the art in view of the foregoing description.

In other words, the present invention encompasses many reasonable substitutions or equivalents of limitations recited in the following claims. Indeed, the present invention is intended to embrace all forms, ramifications, modifications, variations, substitutions, and/or equivalents as fall within the spirit and broad scope of the following claims.

The invention claimed is:

1. A computer-assisted method of facilitating the marketing, redemption, and reimbursement of prepaid vehicle services in a vehicle service network, comprising:
    screening vehicle service stations for participation in the vehicle service network;
    accepting at least some of the vehicle service stations as participant service stations in the vehicle service network;
    storing data associated with the participant service stations in at least one database of a vehicle service network computer;
    receiving participant fees from the participant service stations in exchange for participation in the vehicle service network;
    advertising the vehicle service network to consumers;
    enrolling at least some of the consumers as members of the vehicle service network;
    storing membership data associated with the members in member accounts in the at least one database of the vehicle service network computer;
    receiving prepaid vehicle service fees from the members in exchange for vehicle services to be rendered by the participant service stations and crediting the member accounts in the at least one database of the vehicle service network computer;
    issuing voucher data to the members for redemption at the participant service stations for the vehicle services;
    associating the voucher data with the membership data using the vehicle service network computer and storing the voucher data in the at least one database of the vehicle service network computer;
    using the voucher data to verify membership of the members and authorize performance of at least some of the vehicle services when the members redeem their voucher data;
    debiting the member accounts in the at least one database of the vehicle service network computer, based on the performance of the at least some of the vehicle services;

receiving receipt data from the participant service stations for the performance of the at least some of the vehicle services, wherein the receipt data includes authorization data from the members; and reimbursing the participant service stations for the rendered vehicle services wherein the participant service stations are reimbursed by a vehicle service network administrator.

2. The computer-assisted method of claim 1, wherein said prepaid fees are discounted.

3. The computer-assisted method of claim 1, wherein the voucher data are provided in the form of a bar-coded voucher.

4. The computer-assisted method of claim 1, wherein the advertising is funded using at least a portion of the participant fees.

5. The computer-assisted method of claim 1, wherein the step of receiving prepaid vehicle service fees from the members is carried out using a third party enabler.

6. The computer-assisted method of claim 1, wherein the step of using the voucher data includes scanning bar-coded vouchers.

7. The computer-assisted method of claim 1, wherein the step of using the voucher data includes presenting members with a keypad input device to allow members to enter their PIN's.

8. The computer-assisted method of claim 1, wherein the step of receiving receipt data includes receiving member signatures.

9. The computer-assisted method of claim 1, further comprising:
refunding at least one of membership fees or prepaid services fees to requesting members.

10. The computer-assisted method of claim 9, wherein the step of refunding may be handled using a third party enabler.

11. The computer-assisted method of claim 1, further comprising:
initiating an estimate for vehicle services in addition to the prepaid vehicle services.

12. The computer-assisted method of claim 11, further comprising:
saving the estimate to the at least one database; and
printing an associated diagnostic inspection sheet for use by a service station technician.

13. The computer-assisted method of claim 12, further comprising:
completing the estimate based on feedback from the service station technician, including:
entering recommended labor; and
entering recommended materials by selecting at least one of a material description, material vendor, or material code from a predetermined list of available materials; and
saving the completed estimate to the at least one database.

14. The computer-assisted method of claim 13, further comprising:
accessing and modifying the completed estimate, wherein a service station manager first enters a manager identification and password to allow override of the saved completed estimate;
saving modifications to the modified completed estimate; and
automatically communicating the modifications to at least one of a service station manager or network manager.

15. The computer-assisted method of claim 14, further comprising:

finalizing an invoice for the additional services wherein a service station representative is requested to confirm one or more of the following service information for each line item of the invoice:
vendor information for each material used during the rendered vehicle service, a purchase order number for each material used, or a date of purchase for each material.

16. The computer-assisted method of claim 15, further comprising:
determining whether all recommended service was performed;
scheduling a follow up communication with the member if all recommended service was not performed and storing the scheduled follow up communication in memory.

17. The computer-assisted method of claim 16, further comprising:
listing all scheduled follow up communications;
selecting a follow up communication to open an associated previously entered estimate;
contacting the member to accomplish at least one of the following items:
schedule a service appointment, reschedule another follow up communication, or cancel follow ups for that member.

18. The computer-assisted method of claim 17, further comprising:
entering information to indicate why the customer has cancelled or rescheduled.

19. The computer-assisted method of claim 11, further comprising:
performing a cash audit, including:
counting the amount of daily beginning cash in a service station cash drawer;
entering and saving the amount into the at least one database;
thereafter summing the amount of all cash sales transacted during the day with the daily beginning cash amount and presenting the summed amount to a service station manager;
comparing the amount of cash in the cash drawer with the presented summed amount.

20. A computer-assisted method of facilitating the marketing, redemption, and reimbursement of discounted prepaid vehicle services in a vehicle service network, comprising:
screening vehicle service stations for participation in the vehicle service network;
accepting at least some of the vehicle service stations as participant service stations in the vehicle service network;
storing data associated with the participant service stations in at least one database of a vehicle service network computer;
receiving participant fees from the participant service stations in exchange for participation in the vehicle service network;
advertising the vehicle service network to consumers;
enrolling at least some of the consumers as members of the vehicle service network;
storing membership data associated with the members in member accounts in the at least one database of the vehicle service network computer;
receiving, via a third party enabler, prepaid vehicle service fees from the members in exchange for vehicle services to be rendered by the participant service stations and crediting the member accounts in the at least one database of the vehicle service network computer;

issuing voucher data in the form of a voucher having machine readable code to the members for redemption at the participant service stations for the vehicle services;

associating the voucher data with the membership data using the vehicle service network computer and storing the voucher data in the at least one database of the vehicle service network computer;

using the voucher to verify membership of the members and authorize performance of at least some of the vehicle services when the members redeem their voucher;

debiting the member accounts in the at least one database of the vehicle service network computer, based on the performance of the at least some of the vehicle services;

receiving receipt data from the participant service stations for the performance of the at least some of the vehicle services, wherein the receipt data includes authorization data from the members; and reimbursing the participant service stations for the rendered vehicle services wherein the participant service stations are reimbursed by a vehicle service network administrator.

21. A computer-assisted method of facilitating the marketing, redemption, and reimbursement of discounted prepaid vehicle services in a vehicle service network, comprising:

screening vehicle service stations for participation in the vehicle service network;

accepting at least some of the vehicle service stations as participant service stations in the vehicle service network;

storing data associated with the participant service stations in at least one database of a vehicle service network computer;

receiving participant fees from the participant service stations in exchange for participation in the vehicle service network;

advertising the vehicle service network to consumers;

enrolling at least some of the consumers as members of the vehicle service network;

storing membership data associated with the members in member accounts in the at least one database of the vehicle service network computer;

receiving, via a third party enabler, prepaid vehicle service fees from the members in exchange for vehicle services to be rendered by the participant service stations and crediting the member accounts in the at least one database of the vehicle service network computer;

issuing voucher data in the form of a voucher having machine readable code to the members for redemption at the participant service stations for the vehicle services;

associating the voucher data with the membership data using the vehicle service network computer and storing the voucher data in the at least one database of the vehicle service network computer;

using the voucher to verify membership of the members and authorize performance of at least some of the vehicle services when the members redeem their voucher;

debiting the member accounts in the at least one database of the vehicle service network computer, based on the performance of the at least some of the vehicle services;

receiving receipt data from the participant service stations for the performance of the at least some of the vehicle services, wherein the receipt data includes authorization data from the members;

reimbursing the participant service stations for the rendered vehicle services wherein the participant service stations are reimbursed by a vehicle service network administrator;

initiating an estimate for vehicle services in addition to the prepaid vehicle services;

saving the estimate to the at least one database of the vehicle service network computer;

printing an associated diagnostic inspection sheet for use by a service station technician;

completing the estimate based on feedback from the service station technician, including:
  entering recommended labor; and
  entering recommended materials by selecting at least one of a material description, material vendor, or material code from a predetermined list of available materials; and saving the completed estimate to the at least one database of the vehicle service network computer;

accessing and modifying the completed estimate, wherein a service station manager first enters a manager identification and password to allow override of the saved estimate;

saving modifications to the modified completed estimate in the at least one database of the vehicle service network computer;

automatically communicating the modifications to at least one of a service station manager or network manager; and finalizing an invoice for the additional services wherein a service station representative is requested to confirm one or more of the following service information for each line item of the invoice: vendor information for each material used during the rendered vehicle service, a purchase order number for each material used, or a date of purchase for each material.

* * * * *